United States Patent
Johnson

(10) Patent No.: US 8,780,241 B2
(45) Date of Patent: Jul. 15, 2014

(54) DIGITALLY GRADED NEUTRAL DENSITY FILTER

(75) Inventor: Richard Scott Johnson, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 496 days.

(21) Appl. No.: 13/039,444

(22) Filed: Mar. 3, 2011

(65) Prior Publication Data
US 2012/0188415 A1   Jul. 26, 2012

Related U.S. Application Data

(60) Provisional application No. 61/436,136, filed on Jan. 25, 2011.

(51) Int. Cl.
*H04N 3/14* (2006.01)
*H04N 5/335* (2011.01)

(52) U.S. Cl.
USPC ........... 348/294; 348/298; 348/302; 348/308; 348/312

(58) Field of Classification Search
USPC .............. 348/272, 275, 294–324; 250/208.1; 257/290–292
See application file for complete search history.

(56) References Cited

U.S. PATENT DOCUMENTS

| | | | |
|---|---|---|---|
| 5,881,184 A | 3/1999 | Guidash | |
| 6,864,916 B1 | 3/2005 | Nayar et al. | |
| 2007/0126922 A1* | 6/2007 | Richardson | 348/362 |
| 2007/0242141 A1 | 10/2007 | Ciurea | |
| 2011/0063483 A1* | 3/2011 | Rossi et al. | 348/294 |

* cited by examiner

*Primary Examiner* — Yogesh Aggarwal
(74) *Attorney, Agent, or Firm* — David C. Kellogg

(57) ABSTRACT

Apparatus and a method for performing neutral density filtering in a digital camera. The camera includes a pixel array having rows and columns of pixels. The pixels in the array may be reset and read with variable timing between the reset operation and the read operation. The timing between the reset and read operations is controlled to implement a neutral density filtering operation.

12 Claims, 5 Drawing Sheets

DIGITALLY GRADED NEUTRAL DENSITY FILTER

CROSS REFERENCE TO RELATED APPLICATIONS

This application claims priority of U.S. Provisional Patent Application Ser. No. 61/436,136, filed Jan. 25, 2011, which is incorporated herein by reference.

The subject invention concerns graded neutral density (ND) optical filtering and in particular graded ND filtering that is implemented by selectively controlling the exposure time of an imager.

BACKGROUND OF THE INVENTION

Landscape scenes and other scenes can have very high contrast to them in typically a top-to-bottom gradient. For example, in a landscape scene, the sky may be much brighter than the land. A photograph of the scene, may have limited detail in the image of the sky with good detail of the land or vice versa.

This problem may be corrected by capturing the image through a graded ND filter that lets through less light at the top of the image and more light at the bottom of the image. Such a filter typically has a neutral density portion at the top of the filter and a clear portion at the bottom of the filter. Between these two portions, the density of the filter changes gradually, so as not to cause the line between the neutral density portion and clear portion to be displayed on the image.

In an electronic imager, Using a graded ND filter prevents the pixels corresponding to the bright sky at the top of the image from saturating while not significantly darkening the pixels corresponding to the land at the bottom of the image thus providing the desired level of detail across the image.

SUMMARY OF THE INVENTION

The invention is embodied in apparatus and a method for performing neutral density filtering in a digital camera. The camera includes a pixel array having rows and columns of pixels. The pixels in the array may be reset and read with variable timing between the reset operation and the read operation. The timing between the reset and read operations is controlled to implement a neutral density filtering operation.

BRIEF DESCRIPTION OF THE DRAWINGS

For a more complete understanding of the nature and benefits of the invention, reference should be made to the following detailed description taken in conjunction with the accompanying drawings, in which.

DETAILED DESCRIPTION OF THE INVENTION

The subject invention is embodied in a method of operating an electronic imager that captures high-contrast scene content through integration time adjustment across the image plane. This technique produces similar results to a physical graded ND filter, but with added convenience, adaptability and lower cost as the filtering operation does not require a physical graded ND filter.

By slightly modifying the shutter phase of an active pixel sensor (APS) imager, a high-contrast landscape scene that has a top to bottom contrast gradient can be captured with a desired level of detail across the entire image. In one example embodiment, timing circuitry in a digital camera adjusts the integration time from top to bottom of the sensor; providing a shorter integration time (t1) at the top of the sensor and longer integration times (t2) towards the bottom of the sensor, the integration time in-between the top and bottom portions of the image sensor may be graded between t1 and t2.

Figure 1:
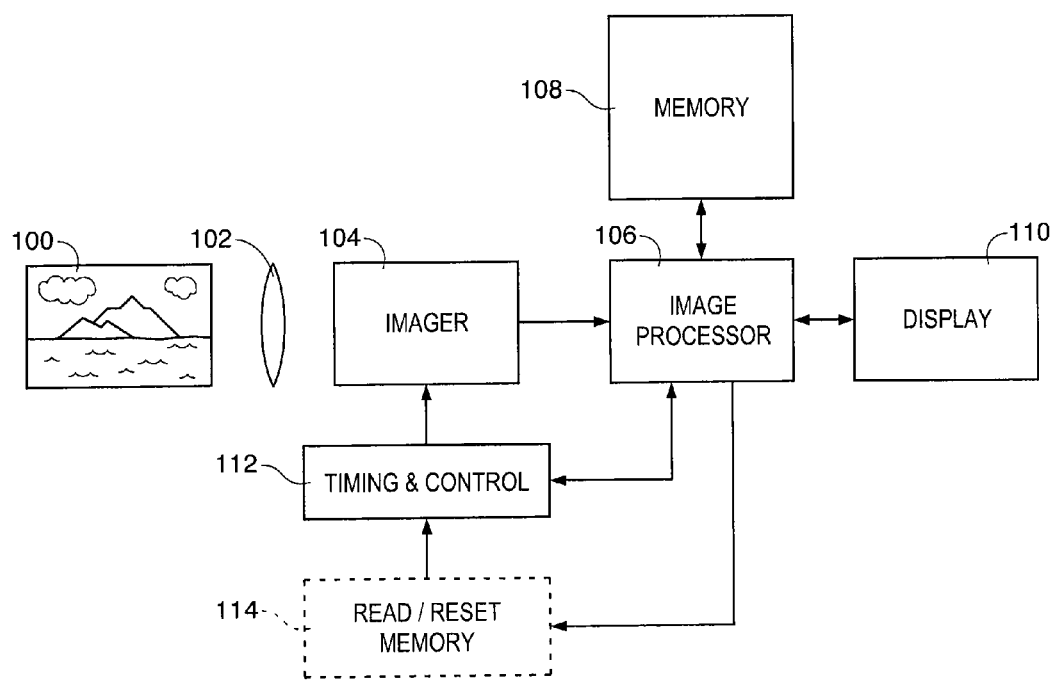
FIG. 1 is a block diagram of an example digital camera system.

FIG. 1 is a block diagram of an example digital camera that may implement such a ND filtering technique. In this camera, a lens 102 focuses an image of a scene 100 onto an APS imager 104. The imager provides a stream of digital pixel values to an image processor 106. The image processor may, for example, process the captured image to interpolate missing pixel values to form a color image, correct for known errors in the imager and adjust the image, for example to correct its white balance, before storing the captured digital image into a memory 108. The image processor 106 may also process the image for display on a display device 110, for example, a liquid crystal device (LCD) display that may be used as a viewfinder.

In addition to processing the image, the processor 106 may control the focus of the image by controlling the relative position of the lens 102 and the imager 104 and may control the timing of the sensor 104, through timing and control circuitry 112 and an optional read/reset memory 114. In one embodiment, the timing and control circuitry 112 may, for example, include two line scan shift registers (not shown), coupled to the row-select terminals of the pixel array of the image sensor 104. These shift registers scan the sensor from top to bottom. One shift register propagates a bit that causes each successive row of the sensor to be reset and the other shift register propagates a bit that causes each successive row of the sensor to be read and provided to the image processor 106.

When the camera shown in FIG. 1 is not using ND filtering, a fixed integration interval is maintained between when a line of pixel sensors is reset and when the same line is read from the imager and provided to the image processor 106. Light impinging on the line of pixel sensors in this interval is converted into a potential value which, in turn, is digitized to produce a line of digital pixel values. This technique is known as "rolling shutter" because the image is not captured at a single point in time but one line at a time as the read shift register scans across the sensor.

Another type of camera employs a global shutter in which all of the pixels are simultaneously reset and then, after a fixed interval, they are all read, typically by transferring the pixel values to non-integrating storage, for example the floating diffusion capacitor of the pixel, and then the non-integrating storage is read either line by line or pixel by pixel to provide the image signal to the processor 106.

In an example embodiment, the timing of the imager is changed to vary the integration time of each line of pixel sensors or each pixel sensor in the image sensor in order to implement ND filtering. For a rolling-shutter imager, for example, the timing of the reset shift register may be advanced with respect to the timing of the read shift register, at the top of the imager to reduce the integration time and delayed toward the bottom of the imager to increase the integration time.

Figure 2A:
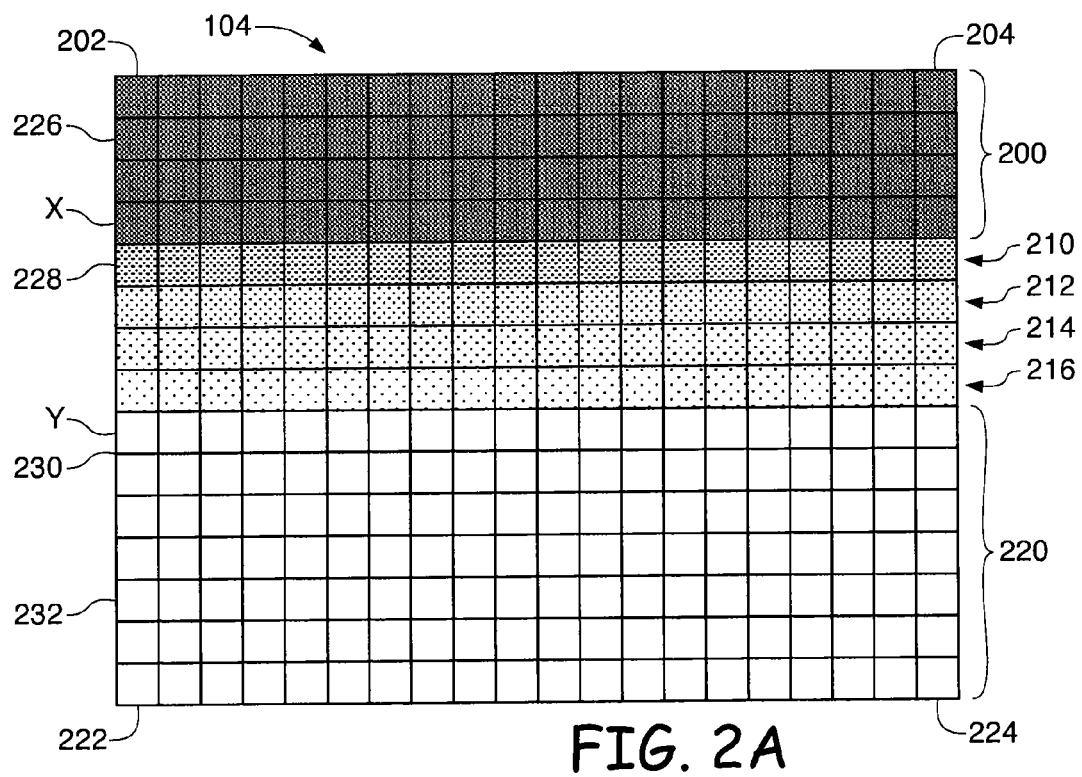
FIGS. 2A, 2B and 2C are example imager exposure diagrams that are useful for explaining the operation of the camera system shown in FIG. 1.

FIG. 2A is a diagram of a simplified imager 104 of the example camera system shown in FIG. 1. Each small square in FIG. 2A represents a pixel of the imager. For convenience, the example imager has a relatively small number of pixels. An actual image may have many more, for example, 1.3 million or more. The imager diagram is shaded to represent the integration time of the various pixels. The darker shaded pixels have a shorter integration time and the brighter shaded or unshaded pixels have a longer integration time. The imager in FIG. 2A shows the relative integration time of imager pixels in which the timing of the reset shift register is advanced at the top of the imager and delayed at the bottom of the imager, while a constant timing is maintained for the read shift register.

The example imager shown in FIG. 2A, may, for example, have an integration time of one $200^{th}$ of a second for the pixels 200 at the top of the imager and an integration time of one $33^{rd}$ of a second for the pixels 220 at the bottom of the imager. In FIG. 2A, X designates the last line of pixels having the short integration time and Y designates the first line of pixels having the long integration time. Between X and Y, in this example, are four lines, 210, 212, 214 and 216 having increasing integration times. These integration times may be, for example, one $166^{th}$, one $133^{rd}$, one $100^{th}$ and one $66^{th}$ of a second, respectively The integration timing may be thought of as a three or more stage piece-wise-linear integration time function as a position of image height, with the first stage being from the top of the image sensor to position X, this stage can have a constant integration time t1; the third stage would be from the image height position Y down to the bottom of the image sensor, this stage can have a constant integration time t2 such that t2>t1; the second stage would be from image height position X down to position Y, with a graded integration time that increases from t1 to t2 monotonically. This graded integration time may be linear or non-linear (e.g. quadratic).

Determining the position of X and Y can be done in several different ways, for example: a multi region auto exposure can be implemented in the imager (either on the APS imager or as standalone). For example, the camera may capture a test image for analysis by the image processor 106. The processor 106 may analyze pixel values at selected positions in the imager, for example, 202, 204, 222, 224, 226, 228, 230 and 232. The results of this regional auto exposure system can be used to best determine the X and Y points as well as t1 and t2.

The image processor 106 may, for example, determine the amount of contrast between the pixels 202 and 204 at the top of the imager and the pixels 222 and 224 at the bottom of the imager. If a large contrast exists, it may attempt to determine the contrast gradient by examining pixels, such as pixels 226, 228, 230 and 232 along one or both sides of the imager. The pixels analyzed to determine the contrast gradient may also include pixels (not shown) internal to the imager. If the processor 106 determines that the gradient is gradual, the number of rows between the X position and the Y position may be relatively large. If, on the other hand, processor 106 determines that there is a sharp gradient across a relatively small number of rows, then the number of rows between the X and Y positions may be small.

The concept of adjusting the integration time across the surface geometry of a sensor is limited by the addressability of individual pixels. For conventional rolling-shutter imagers, pixels are addressable row by row. For pixel architectures that allow for per-pixel addressability, the grading of integration time does not have to be limited from top to bottom, but can be graded across a diagonal, or around objects in a scene.

Figure 2B:
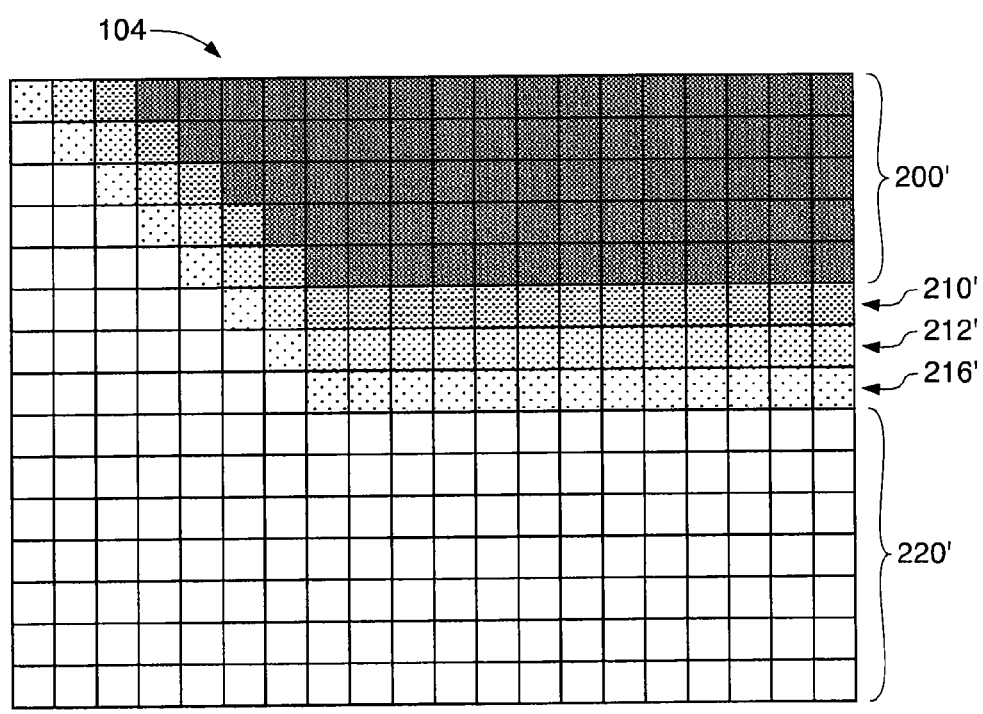

FIG. 2B is an example of an imager in which the integration time may be varied on a per-pixel basis. In the example imager shown in FIG. 2B, some of the pixels in the rows 200' at the top of the imager have a short integration time while other pixels have a long integration time. The captured image for this example may have two gradients, one diagonal from upper right to lower left in the top left quarter of the image and another from the top of the image to the bottom of the image. In this example, the processor 106 may sense the two gradients using the multi-region auto exposure system, described above, and set the reset and read times for the pixels automatically or, as described in more detail below, a user may specify the gradient, for example on the touch-screen display 110, and the processor 106, responsive to the user input, may adjust the integration times of the individual pixels accordingly.

Figure 2C:
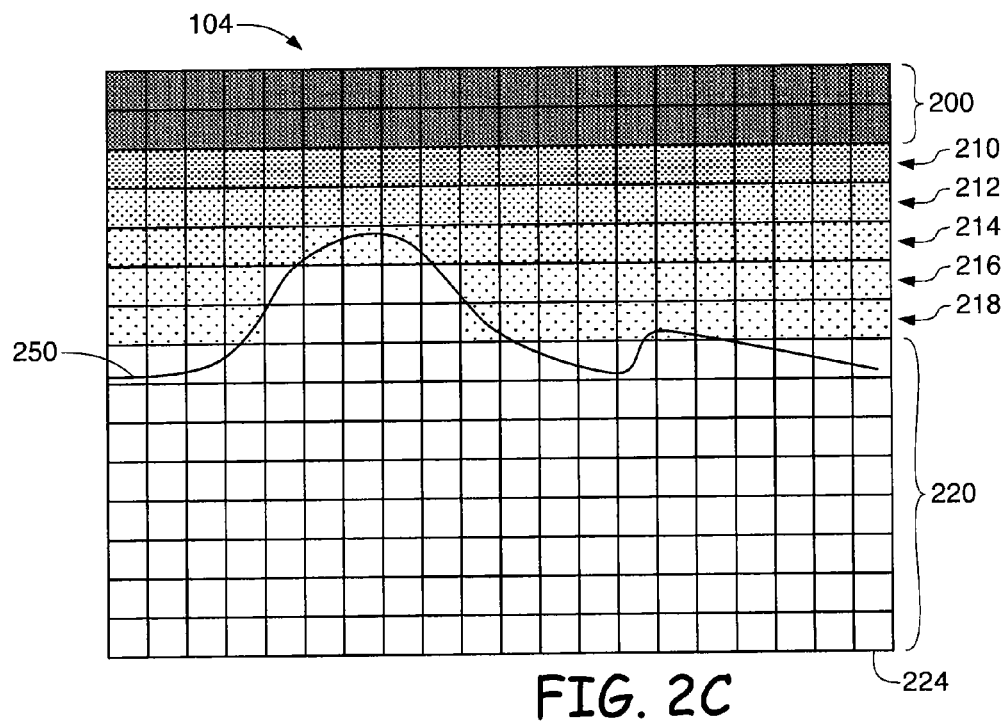

FIG. 2C is an example of an imager in which the integration time may be varied on a per-pixel basis in response to user input. FIG. 2C shows an image including a boundary 250, between a hill and the sky. FIG. 2C also shows an example integration profile that achieves scene-adaptive neutral density filtering of the captured image. As with FIGS. 2A and 2B, the darker pixels have a shorter integration time and the lighter pixels have a longer integration time.

In one example embodiment, the processor 106 may automatically select exposure times for the individual pixels based on the captured image. For example, the processor 106 may first determine if any gradients across multiple pixels exist in the image and the magnitude of these gradients. If a large gradient, affecting a relatively large number of pixels is found, the processor 106 may determine values for t1 and t2 as well as for X and Y. These values desirably reduce the dynamic range of the scene to match the range that may be captured by the imager 104.

As an alternative to the automatic selection by the processor 106, the boundary between the pixels having short and long integration times may be manually selected. In this embodiment of the invention, the image including the hill 250 may be displayed on the touch-screen display device 110, shown in FIG. 1. The user may then, using her finger, for example, draw a line on the imager following the contour of the hill 250. The processor 106 may then use this line to define the boundary for the neutral density filter.

In a simple implementation, the width of the gradient between the short-integration time pixels and the long-integration time pixels may be fixed, for example, at N pixel rows. Alternatively, the user may be able to separately specify the width of the gradient, for example by selecting a line width before tracing the feature on the touch-screen display 110. The user input may be obtained relative to a currently displayed image or to an image that has been previously captured. Where the image is previously captured, the neutral density filtering operation may be implemented using the user-specified parameters to allow the user to align the camera with the filtered scene in order to capture the image properly. Alternatively, the line drawn by the user may be displayed on the display 110 as an alignment aid.

Figure 3:
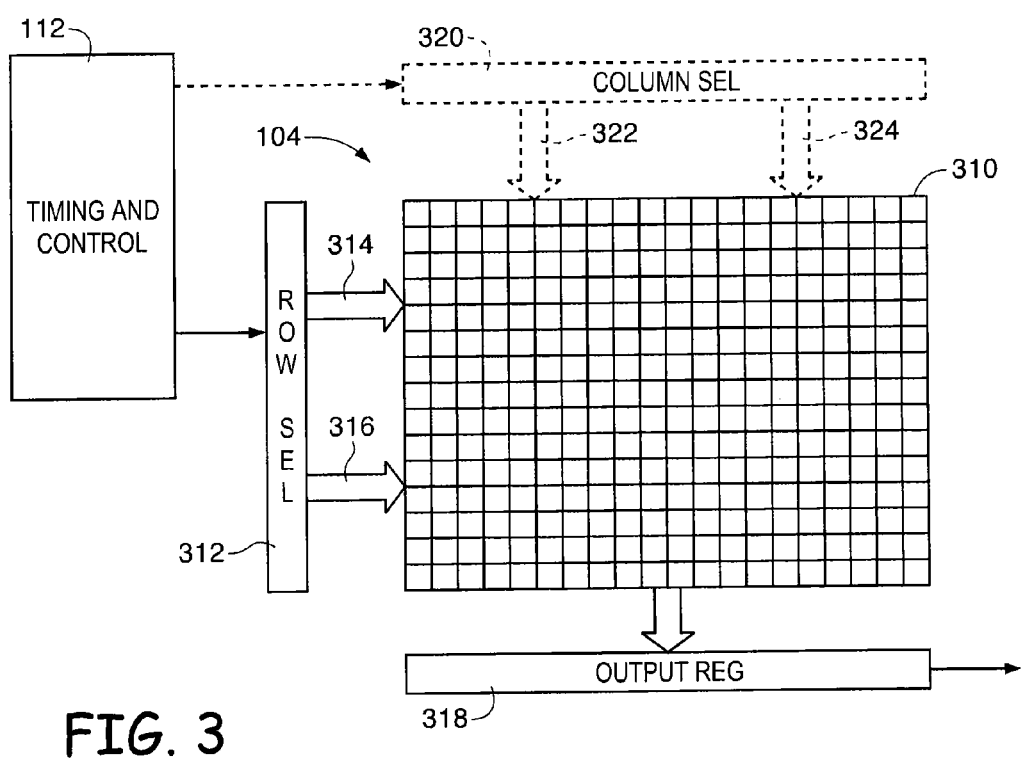
FIG. 3 is a block diagram of an example imager suitable for use in the camera system shown in FIG. 1 and some of its timing and control circuitry.

FIG. 3 is a block diagram showing details of the timing and control circuitry 112 and the imager 104 shown in FIG. 1. The imager 104 includes a pixel array 310 row select circuitry 312, optional column select circuitry 320 and an output register 318. According to one embodiment of the invention using a rolling shutter, the row select circuitry may include the reset and read shift registers, described above. The reset output signals 314 from the reset shift register of the row select circuitry 312 include one output signal for each row of the imager. Each output signal is coupled to a respective row of the imager such that the signal activates reset terminals of each pixel in the row.

The output signals 316 of the read shift register portion of the row select circuitry 312 also include one output line for each row of the imager but each read signal is coupled to the transfer gate terminals of each pixel in the row to cause the charge accumulated on the photodiodes during the integration period to be transferred to the respective floating diffusion capacitors. The read line may also be coupled to the row select terminals of the pixels in the row to drive the column lines of the imager with a voltage proportional to the accumulated charge stored on the respective floating diffusions in order to read the pixel values of the selected row of pixels.

In an alternative embodiment, each pixel is individually addressable such that each pixel in the pixel array 310 includes both a row select input terminal and a column select input terminal in addition to the transfer gate and reset terminals. According to one example embodiment of the invention, the transfer gate is addressed by row and column. In this configuration (described below) both the row and column transfer lines of the pixel are activated to reset and read the pixel. Signals are asserted on the row transfer, column transfer and reset terminals in order to reset the pixel while a signal is asserted on the row transfer column transfer and row select terminals to read the pixel. According to another example embodiment (not shown), a signal is asserted only on the reset terminal to reset the pixel while signals are asserted on the transfer gate, row select and column select circuits to read the pixel value.

Using the first example embodiment, the pixels on a line may be reset at different times to achieve different integration intervals. In a global shutter system, each pixel in the imager may be reset at a respectively different time or groups of pixels, for example, the pixels on a single row or column may be concurrently reset. The timing and control circuit 112, under control of the processor 106 resets the pixels in a predetermined sequence in order to achieve a desired ND filtering operation. The rows of pixels are read either by simultaneously transferring each pixel value to non-integrating storage coupled to the pixel (e.g. the floating diffusion capacitor) or by scanning the row select signal along the image rows in the same way as for a rolling shutter imager. Each row is read, one row at a time, digitized by an analog to digital converter (not shown) and stored into the output register 318. The successive rows of pixel values are read from the output register and provided to the image processor 106.

Using the second example embodiment, all of the pixels in the imager may be reset at the same time by the timing and control circuitry 112 and then the circuitry 112 may activate the row transfer and column transfer electrodes of each individual pixel, using the row select circuitry 312 and column select circuitry 320 in an order that provides different integration times for different pixels in the imager. In this embodiment, if the transfer gate circuitry is coupled to the row select and column select circuitry, the pixel values may be read, digitized and individually passed through the output register 318 to the image processor 106 for storage into a memory or the values may be selectively transferred to the respective floating diffusion capacitances of the pixels and then the values stored on the floating diffusions may be read by activating all of the column select signals and then successively scanning the row transfer and row select electrodes of pixels to transfer the charge from the respective floating diffusion capacitors to the column lines.

Figure 4:
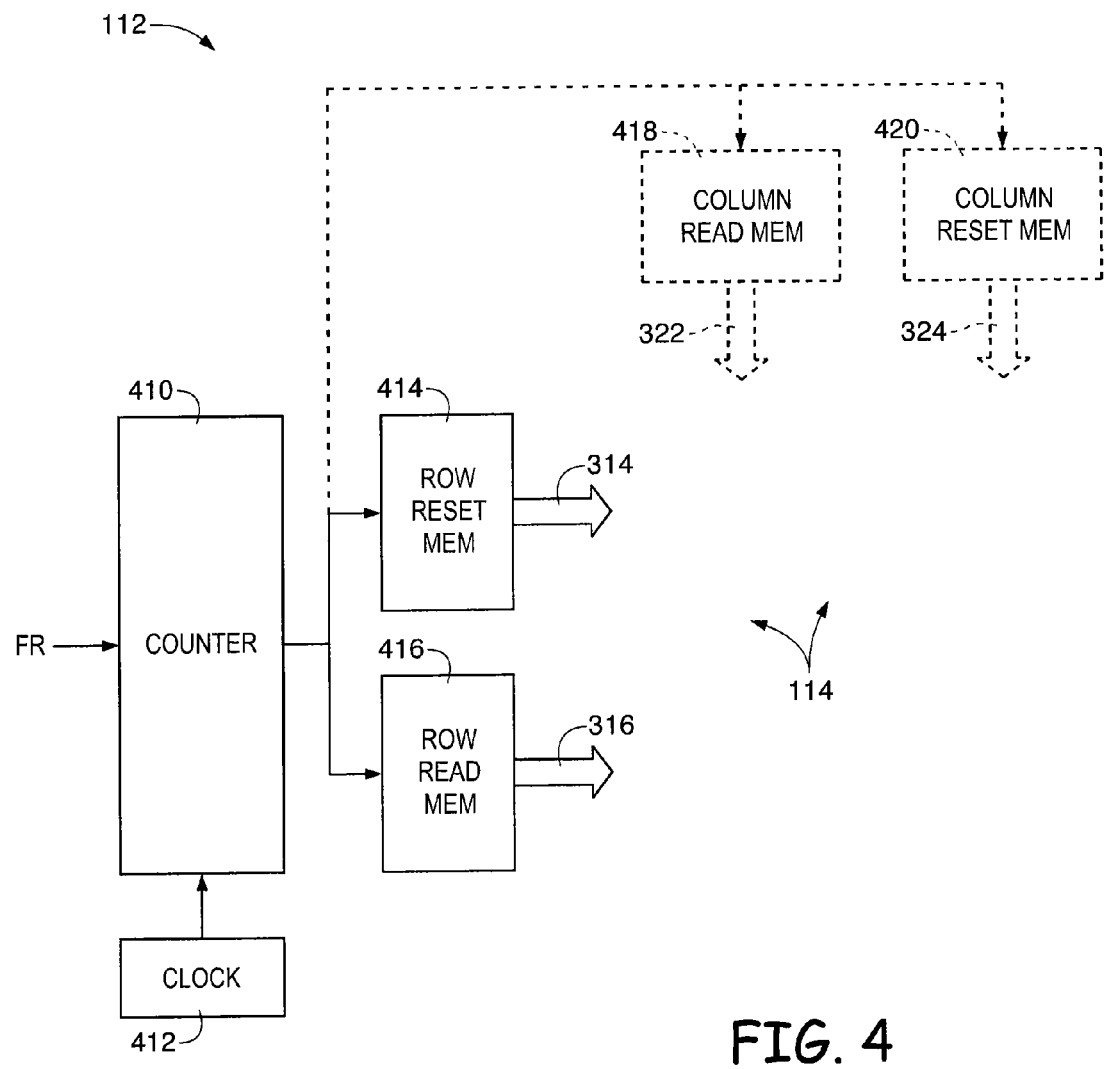
FIG. 4 is a block diagram of example timing and control circuitry suitable for use in the camera system shown in FIG. 1.

FIG. 4 is a block diagram of exemplary timing and control circuitry 112 and optional read/reset memory 114 that may be used to implement the row and column addressing feature of the example embodiments of the invention, described above. The example circuitry includes a clock signal generator 412, a counter 410, a row reset memory 414, a row read memory 416, a column reset memory 420 and a column read memory 418. As described above, the pixel by pixel neutral density filtering of an image may be implemented if either the pixel reset operation or the pixel read operation is addressable by row and column. Thus, for the circuitry shown in FIG. 4, either the row read memory 416 and the column read memory 418 or the row reset memory 414 and the column reset memory 420 may be eliminated.

Figure 5:
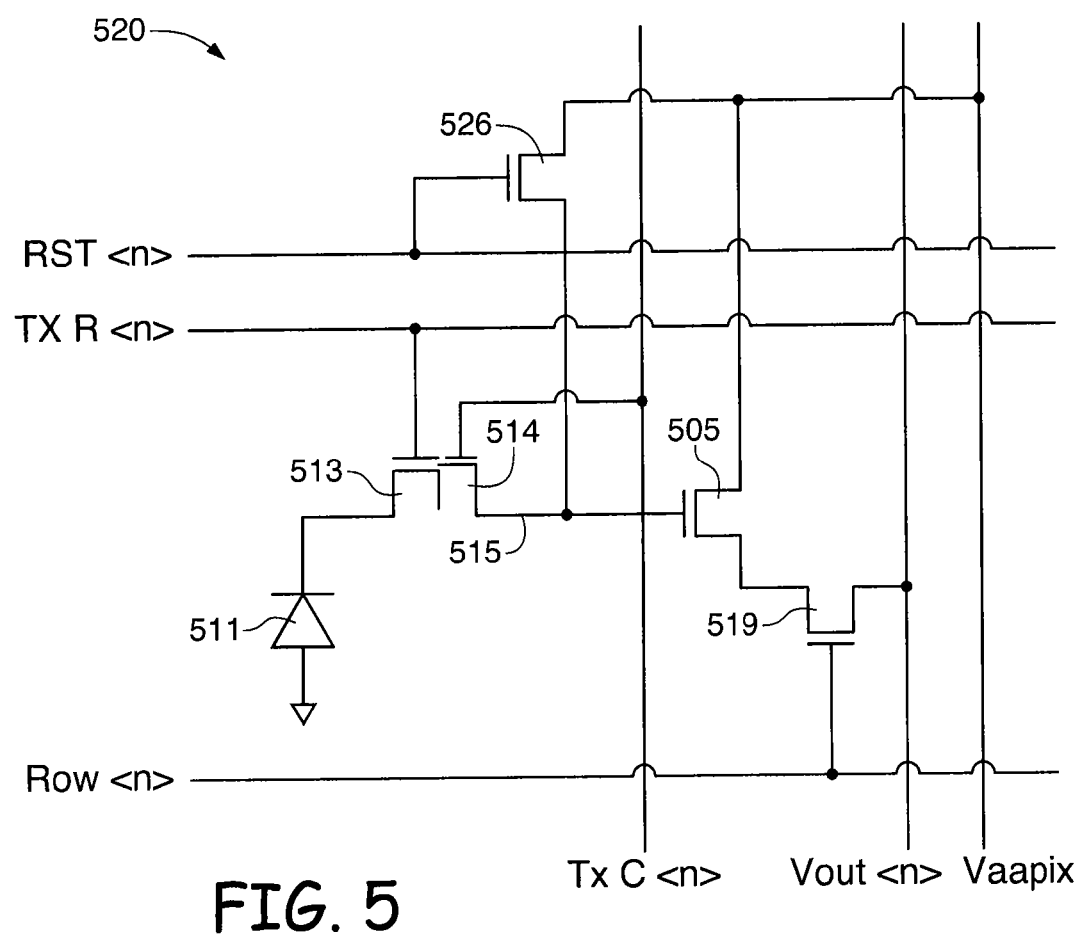
FIG. 5 is a schematic diagram of a pixel suitable for use with one embodiment of the invention.

FIG. 5 is a schematic diagram of an example pixel structure 520 in which the reset and read operations are addressable by row and column. The pixel shown in FIG. 5 includes a photodiode 511, a row transfer gate 513, a column transfer gate 514, and a floating diffusion 515. It also includes a source follower amplifier 505 and row-select transistor 519. The example pixel includes a reset transistor 526 that is activated to reset the floating diffusion 515 and, if the transfer gates 513 and 514 are activated, the photodiode 511. The row transfer gate 513 and column transfer gate 514 are configured as charge-coupled device (CCD) transfer gates. Thus, to read the pixel value from the photodiode 511, the row transfer signal TX R is asserted and, while it is asserted, the column transfer signal TX C is asserted. The signal TX R is then de-asserted followed by the signal TX C. This transfers the charge from the photodiode 511 to the floating diffusion 515.

In practice, the processor 106, after determining the values of t1, t2, X and Y, may translate these values into integration times, represented by a difference in time between the reset operation and the read operation. The counter 410 may include a frame reset signal (FR) that zeroes the counter at the start of an image frame. The clock signal provided by the clock circuitry 412 then counts pulses of the clock signal. Depending on the operational mode of the imager, these pulses may represent, for example, individual pixels of the imager or individual pixel rows. The clock signal value is applied to each of the memories 414 through 420 and, for each count value, the memories provide appropriate addresses on the output signals 314, 316, 322 and 324. These output values control when each pixel in the imager is reset and then read, in order to implement the desired neutral density filtering operation.

Several physical graded ND filters also have color-grades built into them. These color-grades can be used to implement artistic effects in the captured images, such as different tints that vary in intensity across the image. By utilizing the same implementations for the graded ND filter the sensor can use the X and Y data, either input by a user or automatically generated by the image processor 106, as described above, to implement a top-to-bottom, side-to side or diagonal color change across the image. In one example embodiment, the camera can take the user input as to what type of color-shift is preferred and the white balance of the resulting region white balance can be changed digitally in a graded way by the image processor 106 to correlate with the X and Y locations of the digitally graded ND filter.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for performing neutral density filtering in a digital camera having a pixel array including a plurality of pixels arranged in rows and columns, the method comprising:
resetting the plurality of pixels in the pixel array;
reading pixel values from the plurality of pixels in the pixel array with a delay relative to the resetting of the plurality of pixels, wherein the delay from the resetting to the reading of at least selected ones of the plurality of pixels is selected to implement a neutral density filtering operation and wherein the resetting of the plurality of pixels includes:
resetting the pixels row by row across the pixel array with a variable timing such that an interval, t1, between the resetting and reading of respective rows of pixels at a first end of the array is less than an interval, t2, between the resetting and reading of respective rows of pixels at a second end of the array;
resetting the rows of pixels between the first end of the array and a row X of the array with the interval t1 between the resetting of each row of pixels and the reading of the respective row of pixels, where X and Y are integers and Y is greater than X;
resetting the rows of pixels between a row Y of the array and the second end of the array with the interval t2 between the resetting of each row of pixels and the reading of the respective row of pixels; and
resetting rows of pixels between row X and row Y of the pixel array such that each successive row of pixels between row X and row Y has an increasing delay between the resetting and reading of the row, the increasing delay being greater than t1 and less than t2; and
determining values for t1 and t2 including:
capturing an image of a scene using the pixel array;
analyzing pixel values at the first and second ends of the pixel array respectively to determine an image intensity gradient from the first end to the second end; and
setting t1 and t2 to reduce the image intensity gradient.

2. The method of claim 1, further comprising determining values of X and Y including:
analyzing pixel values between the first and second ends of the pixel array to determine a profile of the image intensity gradient;
determining a maximum value of the gradient of the profile and a row of the pixel array corresponding to the maximum gradient;
setting X to be N rows away from the maximum gradient row in the direction of the first end of the pixel array, where N is an integer; and
setting Y to be N rows away from the maximum gradient row in the direction of the second end of the pixel array.

3. The method of claim 2 where N is inversely proportional to the maximum gradient value.

4. Apparatus for performing neutral density filtering in a digital camera, the apparatus comprising:
an imager array including an array of pixels arranged in rows and columns and row select circuitry, each pixel including:
a photodiode;
a floating diffusion capacitance;
a transfer gate coupled between the photodiode and the floating diffusion capacitance for transferring accumulated charge from the photodiode to the floating diffusion capacitance in response to a read signal provided by the row select circuitry; and
a reset input terminal configured to reset the photodiode and the floating diffusion responsive to a reset signal provided by the row select circuitry; and
an image processor, coupled to receive an output signal from the imager array and configured to control the row select circuitry to provide reset signals to the plurality of pixels in the pixel array and to provide the read signal to the plurality of pixels in the pixel array with a delay relative to the reset signal, wherein the delay between the reset signals and read signals of at least selected ones of the plurality of pixels is selected to implement a neutral density filtering operation.

5. The apparatus of claim 4, wherein:
the image processor is configured to control the row select circuitry to reset the plurality of pixels row by row across the pixel array with a variable timing such that an interval, t1, between the resetting and reading of respective rows of pixels at a first end of the array is less than an interval, t2, between the resetting and reading of respective rows of pixels at a second end of the array.

6. The method of claim 5, wherein the image processor is configured to:
control the row select circuitry to reset the rows of pixels between the first end of the array and row X of the array with the interval t1 before controlling the row select circuitry to read respective rows of pixels between the first end of the array and row X of the array;
control the row select circuitry to reset the rows of pixels between a row Y of the array and the second end of the array with the interval t2 before controlling the row select circuitry to read respective rows of pixels between row Y and the second end of the array; and
control the row select circuitry to reset and read rows of pixels between row X and row Y of the pixel array such that each successive row of pixels between row X and row Y has an increasing delay between the resetting and reading of the row, the increasing delay being greater than t1 and less than t2.

7. The method of claim 6, wherein the image processor is further configured to analyze pixel values at the first and second ends of the pixel array respectively to determine an image intensity gradient from the first end to the second end and to set t1 and t2 to reduce the image intensity gradient.

8. The method of claim 7, wherein the image processor is further configured to:
analyze pixel values between the first and second ends of the pixel array to determine a profile of the image intensity gradient, determine a maximum value of the gradient of the profile and a row of the pixel array corresponding to the maximum gradient;
set X to be N rows away from the maximum gradient row in the direction of the first end of the pixel array, where N is an integer; and
set Y to be N rows away from the maximum gradient row in the direction of the second end of the pixel array.

9. Apparatus for performing neutral density filtering in a digital camera, the apparatus comprising:
an imager array including an array of pixels arranged in rows and columns and row select circuitry and column select circuitry, each pixel including:
a photodiode;
a floating diffusion capacitance;
a row transfer gate and a column transfer gate coupled between the photodiode and the floating diffusion capacitance for transferring accumulated charge from the photodiode to the floating diffusion capacitance in response to respective read signals provided by the row select circuitry and column select circuitry; and a reset input terminal configured to reset the photodiode and the floating diffusion responsive to a reset signal provided by the row select circuitry and the column select circuitry; and an image processor, coupled to receive an output signal from the imager array and configured to control the row select circuitry and the column select circuitry to provide reset signals to the plurality of pixels in the pixel array and to provide the read signal to the plurality of pixels in the pixel array with a delay relative to the reset signal, wherein the delay between the reset signals and read signals of at least selected ones of the plurality of pixels is selected to implement a neutral density filtering operation.

10. The apparatus of claim 9, wherein:

the image processor controls the row select circuitry and the column select circuitry to reset the pixels, pixel-by-pixel across the pixel array and to read the pixels row by row along the pixel array with a variable timing such that an interval, t1, between the resetting and reading of respective pixels in a first area of the array is less than an interval, t2, between the resetting and reading of respective pixels of a second area of the array different from the first area.

11. The apparatus of claim 10 wherein image processor is further configured to automatically determine a boundary between the first and second areas based on image exposure levels.

12. The apparatus of claim 10 wherein the camera further includes a touch screen display coupled to the image processor for displaying an image captured by the imager array and for receiving user input specifying a boundary between the first and second areas.

* * * * *